US011754449B2

(12) United States Patent
Henault et al.

(10) Patent No.: US 11,754,449 B2
(45) Date of Patent: Sep. 12, 2023

(54) SYSTEM FOR INSPECTING SURFACES OF AN OPTICAL WAVE USING A GRADUATED DENSITY FILTER

(71) Applicants: CENTRE NATIONAL DE LA RECHERCHE SCIENTIFIQUE, Paris (FR); Observatoire De La Cote D'Azur, Nice (FR); UNIVERSITE COTE D'AZUR, Nice (FR); Université Grenoble Alpes, Saint-Martin-d'Heres (FR)

(72) Inventors: François Henault, Grenoble (FR); Alain Spang, Vence (FR)

(73) Assignees: CENTRE NATIONAL DE LA RECHERCHE SCIENTIFIQUE, Paris (FR); OBSERVATOIRE DE LA COTE D'AZUR, Nice (FR); UNIVERSITE COTE D'AZUR, Nice (FR); UNIVERSITE GRENOBLE APLES, Saint-Martin-d'Heres (FR)

( * ) Notice: Subject to any disclaimer, the term of this patent is extended or adjusted under 35 U.S.C. 154(b) by 194 days.

(21) Appl. No.: 17/310,393

(22) PCT Filed: Jan. 21, 2020

(86) PCT No.: PCT/EP2020/051326
§ 371 (c)(1),
(2) Date: Jul. 30, 2021

(87) PCT Pub. No.: WO2020/156867
PCT Pub. Date: Aug. 6, 2020

(65) Prior Publication Data
US 2022/0099497 A1 Mar. 31, 2022

(30) Foreign Application Priority Data
Jan. 31, 2019 (FR) ...................................... 1900896

(51) Int. Cl.
*G01J 9/00* (2006.01)
*G02B 9/64* (2006.01)

(52) U.S. Cl.
CPC . *G01J 9/00* (2013.01); *G02B 9/64* (2013.01)

(58) Field of Classification Search
CPC .................................... G01J 9/00; G02B 9/64
See application file for complete search history.

(56) References Cited

U.S. PATENT DOCUMENTS

| 4,824,243 A * | 4/1989 | Wheeler | G01J 9/00 |
| | | | 356/121 |
| 6,548,797 B1 * | 4/2003 | Ai | G01J 9/00 |
| | | | 356/121 |

(Continued)

FOREIGN PATENT DOCUMENTS

| DE | 19800844 A1 | 7/1999 |
| WO | WO 03/051189 A2 | 6/2003 |
| WO | WO 03/051189 A3 | 6/2003 |

OTHER PUBLICATIONS

Hardy, James W., et al., "Real-time atmospheric compensation", Journal of the Optical Society of America, Mar. 1977, pp. 360-369, vol. 67, No. 3, Optical Society of America, US.

(Continued)

*Primary Examiner* — Seung C Sohn
(74) *Attorney, Agent, or Firm* — BakerHostetler

(57) ABSTRACT

Systems for inspecting a surface of an optical wave originating from an optical device are provided. The optical device includes an exit pupil, and the inspection system includes an optical measuring head and a computer for processing the images from said optical measuring head. The optical measuring head includes a density gradient filter, the density varying periodically in the two directions in space, a matrix frame having at least four identical lenses of (Continued)

square shape of the same focal length and being arranged symmetrically, and a photodetector array, each of the four lenses forming an image of the pupil in the plane of this array. The image processing computer includes computing means for computing the partial derivatives $$\frac{\partial \Delta}{\partial x}(x, y)$$

and $$\frac{\partial \Delta}{\partial y}(x, y)$$

of the wave surface $\Delta(x, y)$ in the plane of the exit pupil.

5 Claims, 4 Drawing Sheets

(56) References Cited

U.S. PATENT DOCUMENTS

| | | | |
|---|---|---|---|
| 6,707,020 | B1 | 3/2004 | Praus, II et al. |
| 2012/0074294 | A1 | 3/2012 | Streuber et al. |
| 2016/0131901 | A1* | 5/2016 | Huang .................. G01J 9/00 250/201.9 |

OTHER PUBLICATIONS

Hénault, François, "Fresnel diffraction analysis of Ronchi and reverse Hartmann tests", Journal of the Optical Society of America A., Sep. 26, 2018 (Oct. 2018), pp. 1717-1729, vol. 35, No. 10, Optical Society of America, US.

International Searching Authority, International Search Report and Written Opinion received for International Application No. PCT/EP2020/051326, dated Apr. 15, 2020, 20 pages, European Patent Office, Netherlands.

Liang, Junzhong, et al., "Objective measurement of wave aberrations of the human eye with the use of a Hartmann-Shack wavefront sensor", Journal of Optical Society of America A, Jul. 1994, p. 1949-1957, vol. 11, No. 7, Optical Society of America, US.

Malacara, Daniel, Editor, "Chapter 1, Optical Shop Testing", Third Edition, Jul. 2007, 66 pages, John Wiley & Sons, Inc., US.

National Industrial Property Institute, Preliminary Search Report and Written Opinion received for French Application No. FR 1900896, dated Nov. 14, 2019, 8 pages, Republic of France.

Primot, Jérôme, et al., "Extended Hartmann test based on the pseudoguiding property of a Hartmann mask completed by a phase chessboard", Applied Optics, Nov. 1, 2000, pp. 5715-5720 vol. 39, No. 31, Optical Society of America, US.

Roddier, François et al., "Wavefront reconstruction using iterative Fourier transforms", Applied Optics, Apr. 10, 1991, pp. 1325-1327, vol. 30, No. 10, Optical Society of America, US.

Shack, R. V., et al., "Production and use of a lenticular Hartmann screen", Journal of the Optical Society of America, May 1971, p. 656, vol. 61, No. 5, Optical Society of America, US.

* cited by examiner

SYSTEM FOR INSPECTING SURFACES OF AN OPTICAL WAVE USING A GRADUATED DENSITY FILTER

CROSS-REFERENCE TO RELATED APPLICATIONS

This application is a national phase entry of PCT/EP2020/051326, filed on Jan. 21, 2020, which claims the benefit of priority of French Patent Application No. 1900896, filed on Jan. 31, 2019, the contents of which being hereby incorporated by reference in their entirety for all purposes.

FIELD

The technical field of the invention is that of measuring and inspecting surfaces of optical waves. A large number of technical fields require wave surfaces to be inspected. Mention will be made more specifically, but non-exhaustively, of the quality control of optical surfaces or of optics systems, and the inspection of adaptive optics used in fields ranging from astronomy to ophthalmology.

BACKGROUND

The quality control of optical surfaces is an extremely broad field that includes the metrology of individual optical components, the alignment of complex optics systems or the evaluation of the quality of laser beams. It covers the visible, infrared or ultraviolet spectral regions. The measuring apparatuses used at present are interferometers that require the development of cumbersome systems, or of wavefront sensors that are more compact but of poorer accuracy and poorer resolution. Additional information in this regard may be found in the work by D. Malacara entitled "Optical Shop Testing", Third Edition, Wiley 2007.

Large telescopes used for astronomy have adaptive optics systems that require wavefront sensors. These systems are not necessarily well suited to the observation of extended objects such as galaxies or globular clusters. Moreover, these systems may comprise artificial stars that are obtained from laser beams. In this case, adaptive optics systems are necessarily complex in that they comprise the same number of wavefront sensors as there are artificial stars. Further information on this subject may be found in the following publications:

J. W. Hardy, J. E. Lefebvre, C. L. Kolioupoulos entitled "Real-time atmospheric compensation", J. Opt. Soc. Am. Vol. 67, p. 360-369 (1977)

R. V. Shack, B. C. Platt entitled "Production and use of a lenticular Hartmann screen", J. Opt. Soc. Am. Vol. 61, p. 656 (1971)

J. Primot, N. Guérineau entitled "Extended Hartmann test based on the pseudoguiding property of a Hartmann mask completed by a phase chessboard", published in Applied Optics vol. 39, p. 5715-5720 (2000).

In ophthalmology, use is also made of adaptive optics systems based on the use of point laser sources, which may pose other usage problems. The publication by J. Lang, B. Grimm, S. Goelz, J. F. Bille, entitled "Objective measurement of wave aberrations of the human eye with the use of a Hartmann-Shack wave-front sensor", published in J. Opt. Soc. Am. A, vol. 11, p. 1949-2685 (1994) contains further information on this subject.

BRIEF SUMMARY

The system for inspecting optical wave surfaces according to the invention does not exhibit the above drawbacks. It comprises an optical head that comprises only optical elements that are easy to produce and an image processing system. More specifically, the subject of the invention is a system for inspecting a surface of an optical wave originating from an optical device, said optical device comprising an exit pupil, said inspection system comprising an optical measuring head and a computer for processing the images from said optical measuring head, characterized in that
the optical measuring head comprises:
a density gradient filter, in a plane referenced (x', y') perpendicular to the optical axis of the optical measuring head, the transmission T(x', y') of said filter being governed by the equation:

$$T(x', y') = \frac{1 + \sin(2\sqrt{2}\pi (x' - y')/p_x)\sin(2\sqrt{2}\pi (x' + y')/p_y)}{2} \quad [\text{Math. 1}]$$

$p_x$ and $p_y$ representing the periods of the two sinusoidal functions dependent respectively on (x'-y') and (x'+y')

a matrix frame of identical lenses of square shape and of the same focal length, said matrix frame comprising at least four lenses, each centre of one of the four lenses being arranged on an axis passing through the centre of the exit pupil and a point O'M'(i, j) of the density gradient filter such that, in the plane referenced (x', y'), $$O'M'_{i,j} = \begin{bmatrix} i(m + 0.25)p_x/\sqrt{2} \\ j(n + 0.25)p_y/\sqrt{2} \end{bmatrix} \quad [\text{Math. 2}]$$

i and j being able to adopt the values −1 and +1, m and n being positive integers.

a photodetector array, each of the four lenses forming an image of the pupil in the plane of this array, these images being referenced $I''_k(x, y)$, k varying from 1 to 4;

the image processing computer comprises computing means for computing the partial derivatives $$\frac{\partial \Delta}{\partial x}(x, y)$$

and $$\frac{\partial \Delta}{\partial y}(x, y)$$

of the wave surface Δ(x, y) in the plane of the exit pupil, these partial derivatives being equal to $$\frac{\partial \Delta}{\partial x}(x, y) = \quad [\text{Math. 3}]$$
$$Ax + B\sin^{-1}\left(\frac{I''_4(x, y) - I''_3(x, y) + I''_2(x, y) - I''_1(x, y)}{C}\right)$$

$$\frac{\partial \Delta}{\partial y}(x, y) = \quad [\text{Math. 4}]$$
$$Ay + B\sin^{-1}\left(\frac{I''_4(x, y) + I''_3(x, y) - I''_2(x, y) - I''_1(x, y)}{C}\right)$$

A, B and C being constants dependent on the geometric parameters of the optical measuring head.

Advantageously, when the optical device is an objective, its focal plane is located in the plane of the matrix frame of the lenses.

Advantageously, when the optical device is an afocal system, the optical measuring head comprises an additional optic arranged in the exit pupil, such that the focal plane of said additional optic is located in the plane of the matrix frame of the lenses.

Advantageously, the matrix frame comprises at least a second quadruplet of lenses.

Advantageously, the two periods $p_x$ and $p_y$ are equal.

BRIEF DESCRIPTION OF THE SEVERAL VIEWS OF THE DRAWING(S)

The invention will be better understood and other advantages will become apparent on reading the following description, which is given by way of non-limiting example, and from the appended figures in which.

DETAILED DESCRIPTION

Figure 1:
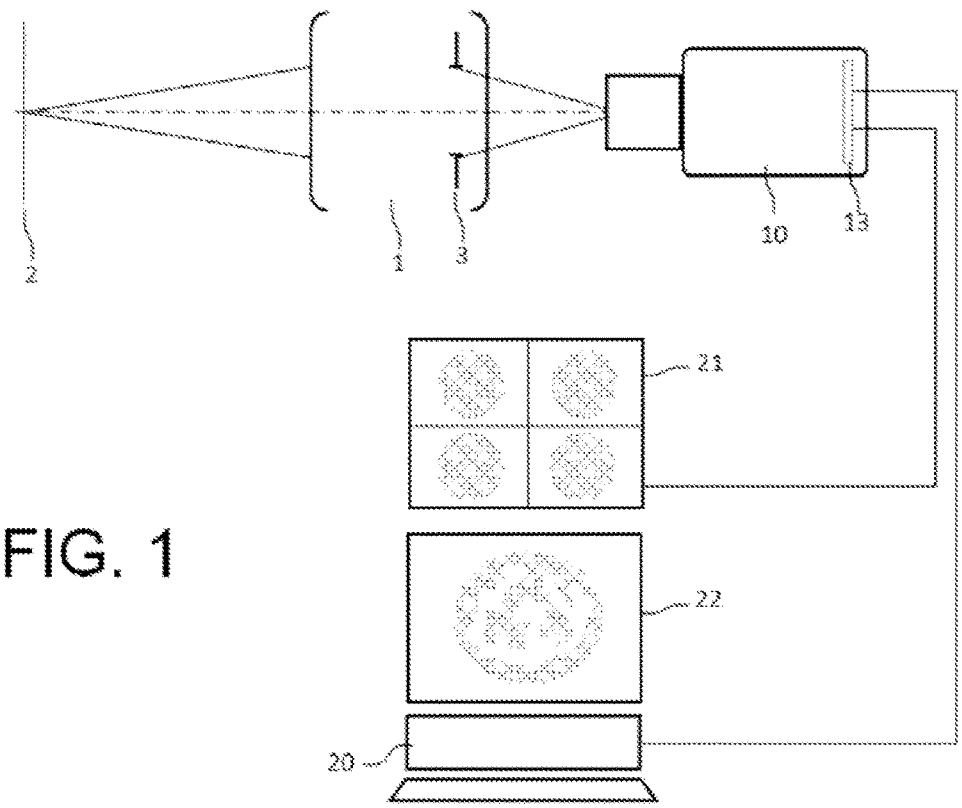
FIG. 1 shows a general view of the inspection system according to the invention.

The general overview of the system for inspecting optical wave surfaces according to the invention is shown in FIG. 1. It essentially comprises an optical head 10 and an image processing computer 20. The optical head comprises a photodetector array 13. This is connected to a first display device 21 that displays the images from the photodetector array. In the same way, the image processing computer comprises a second display device 22 for displaying, inter alia, the processed images and the information required for the processing.

This system is intended to inspect an optical device 1. It forms a luminous image from a luminous object 2 or a light source. When the optical device is an objective, this image is real. When the device is an afocal system, the image is at infinity. As will be seen in the remainder of the description, the inspection system according to the invention is able to inspect these two types of optical devices. In the case of FIG. 1, the optical device is an objective.

The optical device 1 comprises a pupil 3. The purpose of the inspection system is to measure the wave surface of the luminous image given by the optical device at this pupil. The pupil is generally circular in shape. It may comprise a central shutter and the support therefor, where applicable.

Figure 2:
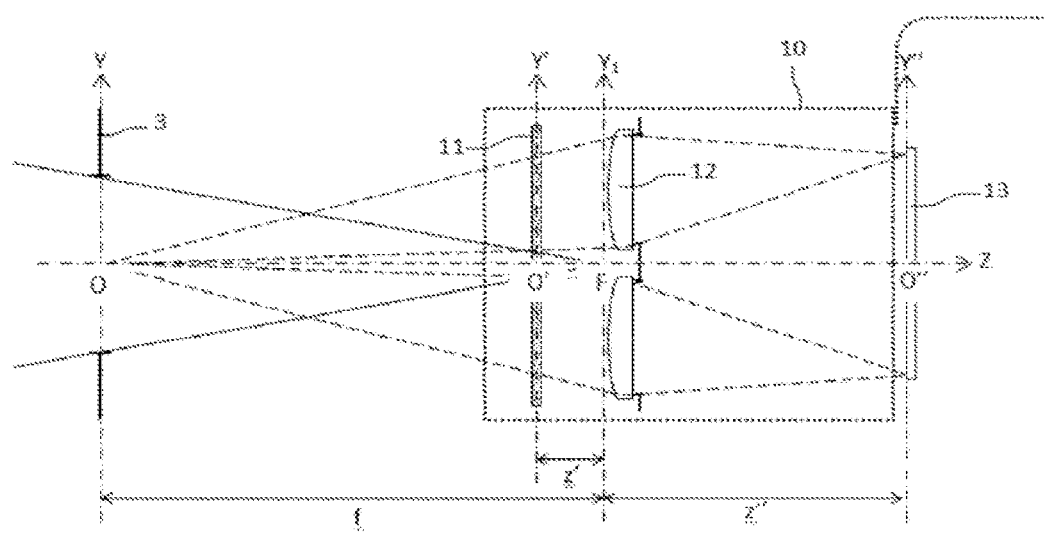
FIG. 2 shows the optical measuring head of the inspection system according to the invention.

The optical head according to the invention is shown in FIG. 2. It essentially comprises a density gradient filter 11, a matrix frame of lenses 12 and the photodetector array 13, as indicated above.

In order to determine the respective positions of these various elements, the following conventions have been adopted.

OXYZ denotes the reference frame attached to the pupil of the optical device. The point O corresponds to the centre of the pupil, and OZ is the optical axis of the optical device. The axis X is perpendicular to the plane of FIG. 2. The points P of the pupil that are located in the plane OXY are denoted by their Cartesian coordinates (x, y). In this reference frame, the wave surface to be measured is denoted $\Delta(x, y)$.

f denotes the distance between the plane of the pupil and the focal plane of the optical device, and F denotes the point of intersection of this focal plane with the optical axis.

O'X'Y'Z denotes the reference frame attached to the plane of the density gradient filter. The axis X' is perpendicular to the plane of FIG. 2. The point O' is located on the optical axis at a distance z' equal to FO' from the focal plane. The points M of the filter that are located in the plane O'X'Y' are denoted by their Cartesian coordinates (x', y').

$FX_1Y_1Z$ denotes the reference system attached to the focal plane of the optical device. The axis $X_1$ is perpendicular to the plane of FIG. 2. The points I located in the plane $FX_1Y_1$ are denoted by their Cartesian coordinates $(x_1, y_1)$. The matrix frame of lenses is located in this plane.

Lastly, O"X"Y"Z denotes the reference frame attached to the photodetector array. The axis X" is perpendicular to the plane of FIG. 2. The images of the pupil that are formed by the lenses of the matrix frame are located in the plane O"X"Y". The point O" is located on the optical axis at a distance z" from the plane $FX_1Y_1$. The points P" located in this plane O"X"Y" are denoted by their Cartesian coordinates (x", y").

The density gradient filter is located in the plane O'X'Y'. Its transmission T(x', y') is equal to the product of two sinusoidal functions rotated 45 degrees about the optical axis. More specifically, the transmission of the filter is equal to:

$$T(x', y') = \frac{1 + \sin(2\sqrt{2}\pi(x' - y')/p_x)\sin(2\sqrt{2}\pi(x' + y')/p_y)}{2} \quad \text{[Math. 5]}$$

$p_x$ and $p_y$ represent the spatial periods of the two sinusoidal functions. These periods may be different. In the remainder of the description, it will be considered that these periods are identical and equal to p.

Figure 3:
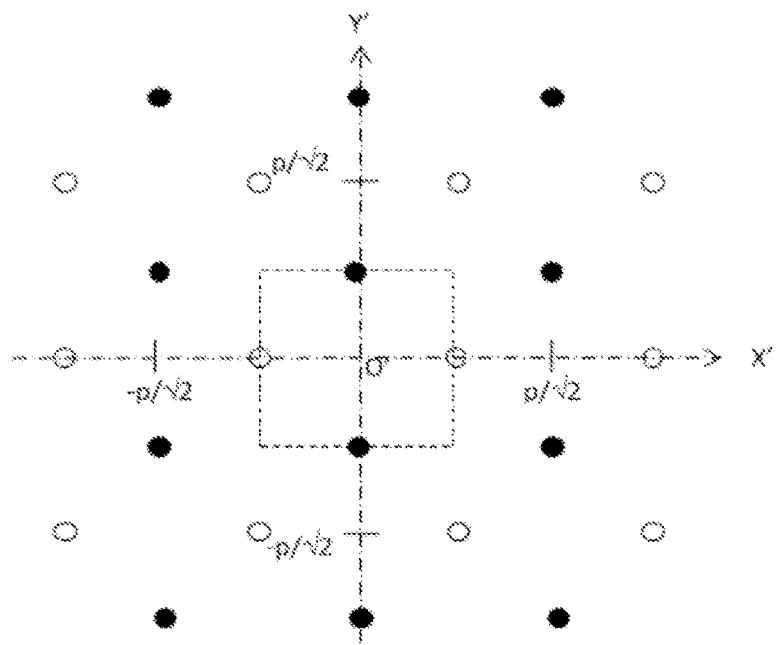
FIG. 3 shows the maxima and minima of the density gradient filter according to the invention.

The minima of the function T(x', y') are equal to 0, and the maxima are equal to 1. FIG. 3 shows the distribution of these minima and these maxima in the plane O'X'Y' of the density gradient filter in the case of identical periods on the two axes. In this FIG. 3, the maxima are represented by white circles, and the minima are represented by black circles.

Figure 4:
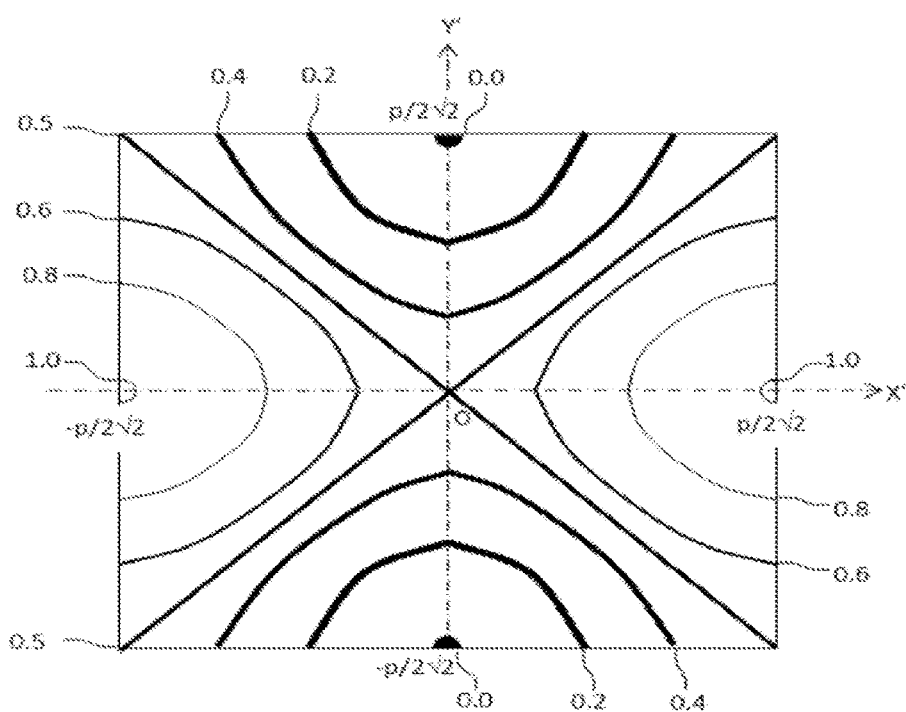
FIG. 4 shows the level curves of the central portion of the filter according to the invention.

FIG. 4 shows the transmission curves of the same value in the plane O'X'Y' limited, on the two axes, to the values between $-p/4\sqrt{2}$ and $+p/4\sqrt{2}$. The thickest lines correspond to the lowest transmission values.

The filter may also comprise an opaque mask having circular apertures. The location of each aperture corresponds to that of a lens of the matrix frame, and its diameter is adapted to the dimensions of this lens. More generally, the shape of the mask corresponds to that of the pupil of the lens.

This filter may be manufactured using various technologies, these being notably optical or electronic lithography, nano-printing, recording of holographic plates or else using liquid crystal modulators.

The matrix frame of mini-lenses 12 is located in the plane $FX_1Y_1$. All of the lenses forming it are identical and have a square cross section. The dimensions of the lenses are between a few millimetres and a few centimetres. The tolerances in terms of the design and the manufacture of these lenses should be such that they do not interfere with the wave surface to be analysed. This does not present any particular difficulties for those skilled in the art, given the small aperture of these lenses.

The focal length $f_L$ of the mini-lenses is adjusted such that each of them forms an image of the pupil in the plane O"X"Y" of the photodetector array.

This frame comprises 4 k lenses, k being an integer greater than or equal to 1. The frame may therefore comprise four lenses, eight lenses, twelve lenses and so on. The lenses are organized into groups of four arranged symmetrically about the optical axis. Each centre of one of the four lenses of the group is arranged on an axis passing through the centre O of the exit pupil and a point O'M'(i, j) of the density gradient filter such that, in the plane referenced (x', y'), $$O'M'_{i,j} = \begin{bmatrix} i(m+0.25)p_x/\sqrt{2} \\ j(n+0.25)p_y/\sqrt{2} \end{bmatrix}$$ [Math. 6]

i and j being able to adopt the values −1 and +1, m and n being positive integers.

The coordinates of the four centres $I_{i,j}$ of the lenses in each group in the plane $FX_1Y_1$ are deduced from the relationship:

$$OI_{i,j} = \frac{f}{f+z'}OM'_{i,j}$$ [Math. 7]

FIGS. 5, 6, 7 and 8 illustrate four examples of possible distributions of said lenses 12. They are shown in the plane $FX_1Y_1$. In these figures, the period p is the same on both axes. These figures also include the density gradient filter.

Figure 5:
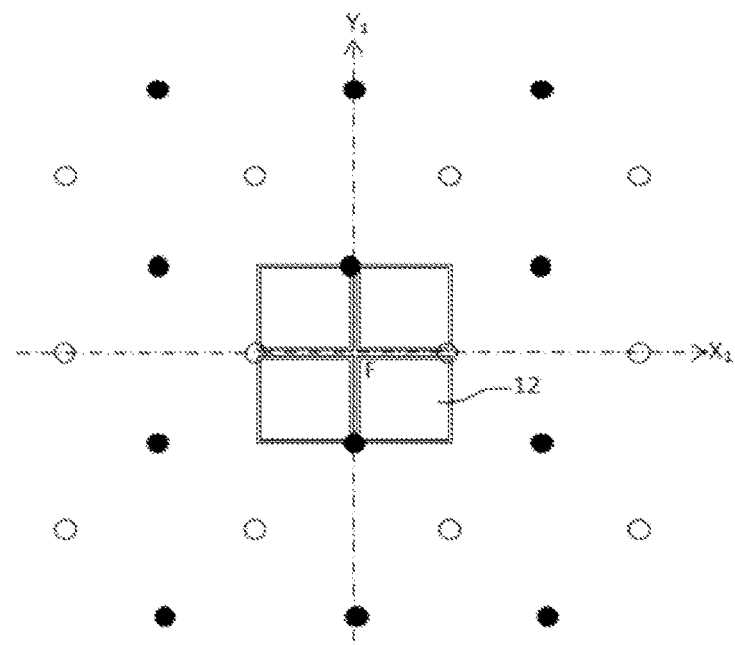
FIG. 5 shows a first distribution of the lenses of the matrix frame according to the invention.

In FIG. 5, the frame comprises a single group of four lenses. In this example, the integers m and n are zero, giving:

$$O'M'_{i,j} = \begin{bmatrix} 0.25ip/\sqrt{2} \\ 0.25jp/\sqrt{2} \end{bmatrix}$$ [Math. 8]

This configuration is the simplest one to implement in that it comprises a minimum number of lenses and, moreover, these are adhesively bonded to one another.

Figure 6:
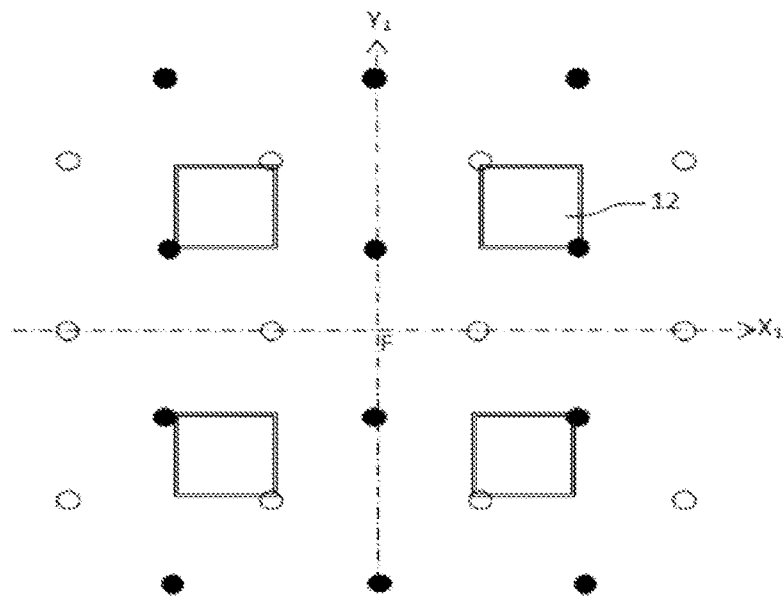
FIG. 6 shows a second distribution of the lenses of the matrix frame according to the invention.

In FIG. 6, the frame also comprises a single group of four lenses. In this example, m and n are equal to 1, giving:

$$O'M'_{i,j} = \begin{bmatrix} 1.25ip/\sqrt{2} \\ 1.25jp/\sqrt{2} \end{bmatrix}$$ [Math. 9]

Figure 7:
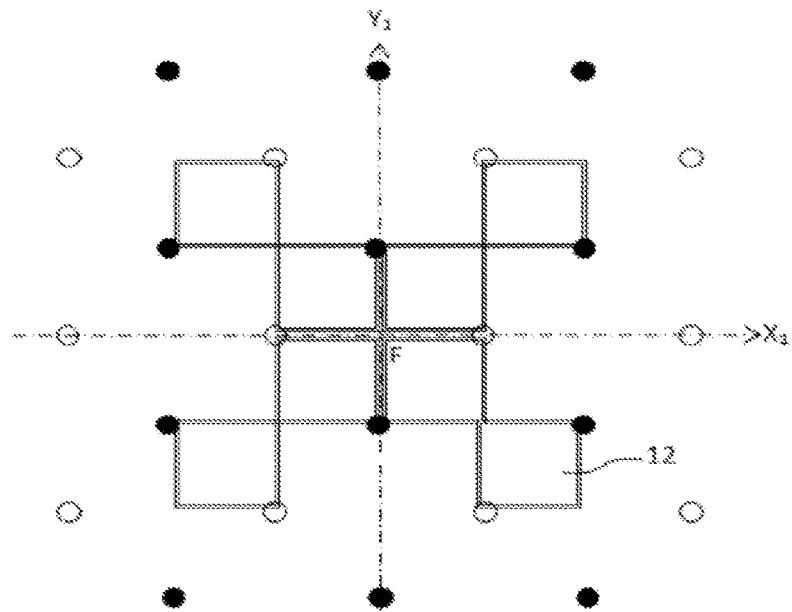
FIG. 7 shows a third distribution of the lenses of the matrix frame according to the invention.

In FIG. 7, the frame comprises the two groups of four lenses from FIGS. 5 and 6.

Figure 8:
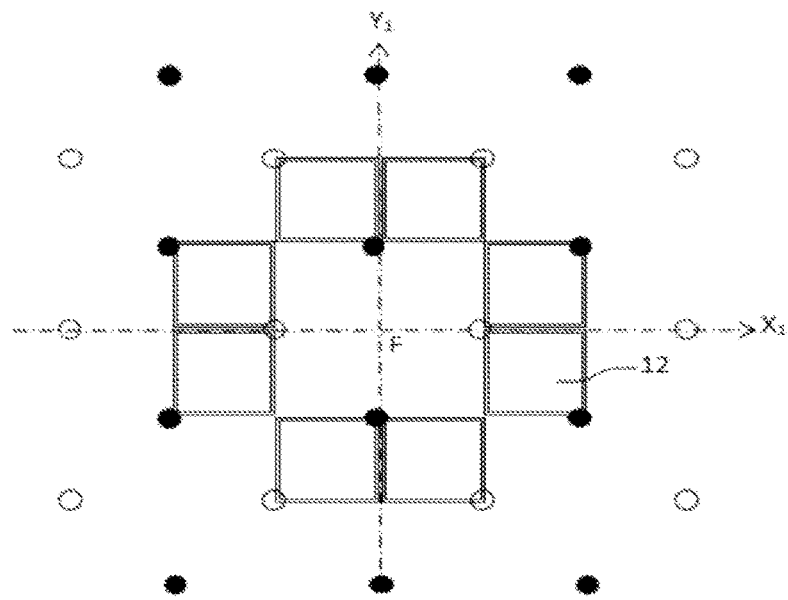
FIG. 8 shows a fourth distribution of the lenses of the matrix frame according to the invention.

In FIG. 8, the frame comprises two groups of four lenses. The centres of the first and second groups satisfy:

$$O'M'_{i,j} = \begin{bmatrix} 0.25ip/\sqrt{2} \\ 1.25jp/\sqrt{2} \end{bmatrix} \text{ and }$$ [Math. 10]

$$O'M'_{i,j} = \begin{bmatrix} 1.25ip/\sqrt{2} \\ 0.25jp/\sqrt{2} \end{bmatrix}$$

The photodetector array is arranged in the plane O"X"Y" containing the images of the pupil that are formed by the lenses of the matrix frame. The sensitivity of the photodetector array is adapted to the spectral band of the luminous object or of the light source to be inspected. This array comprises a number of detectors adapted to the desired spatial resolution. By way of example, an array of 2048× 2048 pixels is sufficient to achieve a maximum spatial resolution of 1000×1000 on the wave surface.

In the above text, the optical device is an objective, and its focal plane is located in the plane of the matrix frame of the lenses. When the optical device is an afocal system, the optical measuring head comprises an additional optic arranged in the exit pupil, such that the focal plane of said additional optic is located in the plane of the matrix frame of the lenses.

It is also possible, regardless of the type of optical device to be measured, to add an optic with a variable focal length in order to optimize the inspection by zooming in for example on a particular region of the pupil.

The image processing computer performs the following functions. Its first function is that of storing the raw images received by the photodetector array. Its second function is that of calibrating these raw images so as to correct the uniformity errors with the pixels of the photodetector array. This calibration is obtained based on known images recorded in a preliminary calibration phase.

The image thus calibrated is separated into the same number of secondary images as there are lenses in the matrix frame. Each secondary image is the image of the pupil of the optical device given by a particular lens. These secondary images are refocused in the plane of the pupil. Each of the images has an intensity distribution denoted $I''_k(x,y)$; k being the index of the secondary image.

The analytical expressions of the intensity distributions of the images are obtained based on Fresnel diffraction analysis. Information about this method may be found in the publication by F. Hénault, "Fresnel diffraction analysis of Ronchi and reverse Hartmann tests", submitted to J. Opt. Soc. Am. A.

By way of example, for a configuration with four lenses as shown in FIG. 5, these distributions are as follows:

$$I''_1(x, y) = \frac{5}{16} - \frac{\cos\gamma}{4}\sin(\sqrt{2}\,\varphi'_x) -$$ [Math. 11]

$$\frac{\cos\gamma}{4}\sin(\sqrt{2}\,\varphi'_y) - \frac{\cos2\gamma}{8}\sin(\sqrt{2}\,\varphi'_x)\sin(\sqrt{2}\,\varphi'_y) -$$

$$\frac{1}{32}\cos(\sqrt{2}\,\varphi'_x + 4\gamma) - \frac{1}{32}\cos(\sqrt{2}\,\varphi'_y + 4\gamma)$$

$$I''_2(x, y) = \frac{5}{16} + \frac{\cos\gamma}{4}\sin(\sqrt{2}\,\varphi'_x) -$$ [Math. 12]

$$\frac{\cos\gamma}{4}\sin(\sqrt{2}\,\varphi'_y) + \frac{\cos2\gamma}{8}\sin(\sqrt{2}\,\varphi'_x)\sin(\sqrt{2}\,\varphi'_y) -$$

$$\frac{1}{32}\cos(\sqrt{2}\,\varphi'_x + 4\gamma) - \frac{1}{32}\cos(\sqrt{2}\,\varphi'_y + 4\gamma)$$

$$I''_3(x, y) = \frac{5}{16} - \frac{\cos\gamma}{4}\sin(\sqrt{2}\,\varphi'_x) +$$ [Math. 13]

$$\frac{\cos\gamma}{4}\sin(\sqrt{2}\,\varphi'_y) + \frac{\cos2\gamma}{8}\sin(\sqrt{2}\,\varphi'_x)\sin(\sqrt{2}\,\varphi'_y) -$$

-continued $$I_4''(x, y) = \frac{5}{16} + \frac{\cos\gamma}{4}\sin(\sqrt{2}\,\varphi_x') +$$

$$\frac{\cos\gamma}{4}\sin(\sqrt{2}\,\varphi_y') - \frac{\cos 2\gamma}{8}\sin(\sqrt{2}\,\varphi_x')\sin(\sqrt{2}\,\varphi_y') -$$

$$\frac{1}{32}\cos(\sqrt{2}\,\varphi_x' + 4\gamma) - \frac{1}{32}\cos(\sqrt{2}\,\varphi_y' + 4\gamma)$$

$$\frac{1}{32}\cos(\sqrt{2}\,\varphi_x' + 4\gamma) - \frac{1}{32}\cos(\sqrt{2}\,\varphi_y' + 4\gamma) \quad \text{[Math. 14]}$$

This gives, using the above notations:

$$\varphi_x' = \frac{2\pi(f+z')}{p}\frac{\partial\Delta}{\partial x}(x, y) + \frac{2\pi z'}{fp}x, \quad \text{[Math. 15]}$$

$$\varphi_y' = \frac{2\pi(f+z')}{p}\frac{\partial\Delta}{\partial y}(x, y) + \frac{2\pi z'}{fp}y \text{ and}$$

$$\gamma = 2\pi\lambda\frac{z'(f+z')}{fp^2}$$

$$\frac{\partial\Delta}{\partial x}(x, y) \text{ and } \frac{\partial\Delta}{\partial y}(x, y)$$

represent the derivatives of the wave surface at each point P of the pupil.

From the secondary images, it is then possible to compute these two derivatives of the wave surface. This gives:

$$\frac{\partial\Delta}{\partial x}(x, y) = \frac{z'}{f(f+z')}x + \quad \text{[Math. 16]}$$

$$\frac{p}{2\pi\sqrt{2}\,(f+z')}\sin^{-1}\left(\frac{I_4''(x,y) - I_3''(x,y) + I_2''(x,y) - I_1''(x,y)}{\cos\gamma}\right)$$

$$\frac{\partial\Delta}{\partial y}(x, y) = \frac{z'}{f(f+z')}y + \quad \text{[Math. 17]}$$

$$\frac{p}{2\pi\sqrt{2}\,(f+z')}\sin^{-1}\left(\frac{I_4''(x,y) + I_3''(x,y) - I_2''(x,y) - I_1''(x,y)}{\cos\gamma}\right)$$

Lastly, it is possible to reconstruct the wave surface $\Delta(x, y)$ from these two partial derivatives from the integration thereof. Further information in this regard may be found in the publication by F. Roddier, C. Roddier, "Wavefront reconstruction using iterative Fourier transforms", Applied Optics vol. 30, p 1325-1327 (1991).

The optimization of the spatial period of the density gradient filter has to satisfy two opposing constraints.

The equations giving the phase variations $\varphi'x$ and $\varphi'y$ show that the values to be measured $$\frac{\partial\Delta}{\partial x}(x, y) \text{ and } \frac{\partial\Delta}{\partial y}(x, y)$$

are amplified by a factor g, which is called gain and has the value:

$$g = \frac{2\pi(f+z')}{p}.$$

Choosing a high gain makes it possible to maximize the variations in intensity in the acquired images. Compliance with this sensitivity criterion leads to the promotion of short spatial periods, so as to minimize the parameter p.

Furthermore, the use of a filter constructed from periodic functions leads to an effect of replicating the image of the pupil of the optical device to be measured. This effect results in the relative defocusing p of the secondary images. It is demonstrated that this parameter has the value:

$$\rho = \frac{\lambda(f+z')}{Dp},$$

D being the diameter of the pupil.

This parameter should be as low as possible, typically less than 1%, which leads to the promotion of long spatial periods.

It is possible to establish a compromise between these two opposing tendencies by way of a least squares criterion C having the value:

$$C = \rho^2 + \frac{w^2}{g^2} = \frac{\lambda^2(f+z')^2}{D^2p^2} + \frac{w^2p^2}{4\pi^2(f+z')^2} \quad \text{[Math. 18]}$$

Where w is a scale factor between $10^3$ and $10^4$. The minimum of the criterion is reached when the period $p_0$ has the value:

$$p_0 = (f+z')\sqrt{\frac{2\pi\lambda}{wD}} \quad \text{[Math. 19]}$$

This period $p_0$ may be fine-tuned by way of simulations.

By way of example, for a telescope with a focal length of 100 metres, with an aperture of 10 metres and used in the visible at a wavelength centred on 0.5 microns, the optical head being arranged at the focal point of this telescope, the spatial period of the filter is 1 millimetre.

The measurement accuracy that is obtained is of the order of one hundredth of a wavelength and the measurement time is less than one hundredth of a second. This time is short enough to overcome interference generated by the environment, such as micro-vibrations and atmospheric turbulence.

The invention claimed is:

1. A system for inspecting a surface of an optical wave originating from an optical device, said optical device comprising an exit pupil, said inspection system comprising an optical measuring head and a computer for processing the images from said optical measuring head, wherein:
   the optical measuring head comprises:
      a density gradient filter, in a plane referenced (x', y') perpendicular to the optical axis of the optical measuring head, the transmission T(x', y') of said filter being governed by the equation:

$$T(x', y') = \frac{1 + \sin(2\sqrt{2}\,\pi(x'-y')/p_x)\sin(2\sqrt{2}\,\pi(x'+y')/p_y)}{2}$$

$p_x$ and $p_y$ representing the periods of the two sinusoidal functions dependent respectively on (x'−y') and (x'+y');
      a matrix frame of identical lenses of square shape and of the same focal length, said matrix frame comprising at least four lenses, each center of one of the four lenses being arranged on an axis passing through the center of the exit pupil and a point O'M'(i, j) of the density gradient filter such that, in the plane referenced (x', y'), $$O'M'_{i,j} = \begin{bmatrix} i(m+0.25)p_x/\sqrt{2} \\ j(n+0.25)p_y/\sqrt{2} \end{bmatrix}$$

i and j being able to adopt the values −1 and +1, m and n being positive integers; and a photodetector array, each of the four lenses forming an image of the pupil in the plane of this array, these images being referenced $I''_k(x, y)$, k varying from 1 to 4; and the image processing computer comprises computing means for computing the partial derivatives $$\frac{\partial \Delta}{\partial x}(x, y) \text{ and } \frac{\partial \Delta}{\partial y}(x, y)$$

of the wave surface $\Delta(x, y)$ in the plane (x, y) of the exit pupil, these partial derivatives being equal to $$\frac{\partial \Delta}{\partial x}(x, y) = Ax + B\sin^{-1}\left(\frac{I''_4(x, y) - I''_3(x, y) + I''_2(x, y) - I''_1(x, y)}{C}\right)$$

$$\frac{\partial \Delta}{\partial y}(x, y) = Ay + B\sin^{-1}\left(\frac{I''_4(x, y) + I''_3(x, y) - I''_2(x, y) - I''_1(x, y)}{C}\right)$$

A, B and C being constants dependent on the geometric parameters of the optical measuring head.

2. The inspection system according to claim 1, wherein, when the optical device is an objective, its focal plane is located in the plane of the matrix frame of the lenses.

3. The inspection system according to claim 1, wherein, when the optical device is an afocal system, the optical measuring head comprises an additional optic arranged in the exit pupil, such that the focal plane of said additional optic is located in the plane of the matrix frame of the lenses.

4. The inspection system according to claim 1, wherein the matrix frame comprises at least a second quadruplet of lenses.

5. The inspection system according to claim 1, wherein the two periods $p_x$ and $p_y$ are equal.

* * * * *